(12) United States Patent
Lutz (10) Patent No.: US 6,955,608 B1
(45) Date of Patent: Oct. 18, 2005

(54) DOUBLE JOINT FOR STEERING AXLES IN AUTOMOBILES

(75) Inventor: Christian Lutz, Nüziders (AT)

(73) Assignee: Krupp Presta AG, Eschen (LI)

( * ) Notice: Subject to any disclaimer, the term of this patent is extended or adjusted under 35 U.S.C. 154(b) by 0 days.

(21) Appl. No.: 09/600,593

(22) PCT Filed: Jan. 13, 1999

(86) PCT No.: PCT/CH99/00013

§ 371 (c)(1),
(2), (4) Date: Sep. 7, 2000

(87) PCT Pub. No.: WO99/36708

PCT Pub. Date: Jul. 22, 1999

(30) Foreign Application Priority Data

Jan. 19, 1998 (AT) .............................. 108/98

(51) Int. Cl.[7] .............................................. F16D 3/36
(52) U.S. Cl. ........................ 464/118; 403/135; 403/138
(58) Field of Search ................................ 464/115, 116, 464/117, 118, 905, 151; 403/122, 132, 133, 135, 136, 138

(56) References Cited

U.S. PATENT DOCUMENTS

| | | | | |
|---|---|---|---|---|
| 1,556,719 | A | * | 10/1925 | Robinson ................. 464/151 X |
| 2,024,912 | A | * | 12/1935 | Curtis ........................ 464/151 |
| 2,945,364 | A | * | 7/1960 | Marquis et al. .............. 464/116 |
| 2,953,001 | A | | 9/1960 | Hufstader |
| 2,986,022 | A | * | 5/1961 | Stokely ...................... 464/118 |
| 3,029,618 | A | * | 4/1962 | Bouchard et al. ........... 464/118 |
| 3,296,833 | A | * | 1/1967 | McCarthy ................... 464/116 |
| 3,429,144 | A | | 2/1969 | McIntosh |
| 3,835,667 | A | | 9/1974 | King et al. |
| 4,160,626 | A | * | 7/1979 | Bell ........................ 403/122 X |
| 4,207,757 | A | * | 6/1980 | Onuma ................... 464/118 X |
| 6,692,363 | B1 | * | 2/2004 | Heutschi et al. ............ 464/118 |

FOREIGN PATENT DOCUMENTS

| | | | | |
|---|---|---|---|---|
| AT | 212647 | * | 12/1980 | .................. 464/89 |
| CA | 604536 | * | 9/1960 | ................. 464/151 |
| DE | 39 21 242 | | 6/1990 | |
| FR | 2 730 744 | | 8/1996 | |
| GB | 913365 | | 12/1962 | |
| GB | 2 017 256 | | 10/1979 | |
| WO | WO 95/12073 | | 5/1995 | |

OTHER PUBLICATIONS

Universal Joint and Driveshaft Design Manual, Advances in Engineering Series No. 7, Warrendale, PA, The Society of Automotive Engineers, Inc., pp. 99–105, TJ1079.S62 1979.*

* cited by examiner

*Primary Examiner*—Greg Binda
(74) *Attorney, Agent, or Firm*—Crowell & Moring LLP (57) ABSTRACT

A steering shaft universal joint assembly for motor vehicles as provided. Shaft ends are fastened against rotation in the joint, the ends being held in a housing joint adjoining the two joints with interposition of a ball joint so that the ball of the ball joint is mounted for rotation about its center point in a socket of one shaft end and is slidingly movable in a direction of the shaft axis of the other shaft end. The ball is resiliently mounted in the socket and the socket receives a slide bushing.

33 Claims, 7 Drawing Sheets

DOUBLE JOINT FOR STEERING AXLES IN AUTOMOBILES

The invention relates to a steering shaft universal joint for motor vehicles with shaft ends fastened against rotation in the joint, these ends being held for movement in a housing joining the two joints and the shaft ends being joined together between the two joints by a ball joint so that the ball is mounted for rotation about its center point in a socket of the other shaft end and is slidingly movable in the direction of the shaft axis of the other shaft end.

One known double joint system is, for example, the double-cross universal joint with a ball joint disposed between the two joint crosses. In known systems of universal joints, two joint crosses are connected movably around the one joint cross axis by a fork on each of the two shaft ends and movably about the other joint axis to a connecting housing. The centering is performed by a jointed connect-on of the two shaft ends within the connecting housing of a metal joint ball at the one end of the shaft and a cylindrical socket, also of metal, on the other shaft end into which the joint ball enters. The connecting housing forms a hollow space in the interior, which creates a free space for the movement of the centering joint coupling and its size is proportional to the maximum angular deflection of the two shaft, ends with respect to the extended axis. The ends or stubs of the two crosses are mounted for ease of movement, for example on rolling bearings which are situated in bores in the fork arms and in the connecting housing, respectively. The universal joint mounting with its eight bearing points as well as the central ball mounting requires great precision to be able to assure easy movement of the universal joint. A slight misalignment of the two shaft axes within the plane of deflection can result in jamming in certain positions, which can greatly interfere with ease of movement. Moreover this also leads to undesirable wear.

To limit such disadvantages the bearings must be made with sufficient precision, which results in greater cost of manufacture. Another known possibility for reducing the problem is to provide rubber-elastic material as an insert around the stubs of the universal bearing such that the bearings will be able, with the easy elastic movement thus achieved, to adjust to the manufacturing tolerances and at the same time have a vibration damping action. A rubber-elastic support of two to all eight universal joint stubs is restrictive when small sizes are required, and it is difficult and expensive to achieve.

The present invention is addressed to the problem of proposing a steering shaft universal joint in which the disadvantages of the state of the art are eliminated. In particular, the problem consists in achieving a double joint which in addition to ease of movement is easy to install, inexpensive to make, and insensitive to production tolerances.

The problem is solved according to the invention by providing a universal joint of the above-noted type with one of the following characterizing features; (i) the balls resiliently mounted in the socket; and (ii) an abutment arrangement for the ball and socket is arranged on the inner wall of the housing. Additional advantageous embodiments are described herein.

According to the invention, the socket for the balls which link the two shaft ends together is made for tumbling resiliently or spring elastically. This is possible with very low fatigue and adjustable spring force. This allows a very low-cost configuration, since the equalization of tolerances by the resilient journaling needs to be performed only once.

The ball on the one shaft extremity is preferably held in the socket of the other shaft extremity such that the socket for the ball is configured as a slide bushing and this bushing envelops the ball. The bushing in turn is resiliently mounted in that the bushing or the socket which can contain the slide bushing can be fastened through resilient means such as springs to the one shaft extremity and to the fork, respectively, such that the socket, in case of excessive radial forces, can be pushed away by the ball in a kind of tumbling movement, until the tolerance is compensated.

The slide bushing in which the ball slides and turns is made from a sliding bearing material, and such a bushing can also have a lubricant coating. Especially suitable, however, are bushings made from a sintered metal on a supporting sleeve.

The bushing itself should be made such that together with the ball it forms a bearing with no free play. This is achieved by the fact that the slide bushing makes spring-elastic contact with the ball with a certain bias and thus without free play. Slotting the outer wall of the slide bushing makes this possible so that the slide bushing can breathe in the radial direction. In this manner both radial tolerances, for example those of the ball diameter, are absorbed and departures from tolerances of the shaft are equalized through the resilient mounting of the bushing.

Another advantageous embodiment consists in the fact that a plastic guide is applied to the ball of the joint, and then the plastic guide itself slides in the slide bushing or the cylindrical socket. In this case it is possible to manufacture the bushing or the socket even without any special bearing material. The bearing bushing can even be omitted and the plastic part holding the ball then glides with direct guidance in the bearing sleeve which is resiliently mounted for tumbling movement.

In universal joint systems especially of the kind mentioned above it is furthermore important that, when the joint is assembled, a guide means is present which brings the ball joint together in a selective manner, and furthermore that in extreme-end positions of the joint, which do not correspond to normal operations, a defined abutment is provided for safety reasons. By designing the junction housing accordingly in the internal area with corresponding surrounding abutment surfaces this can be established. Care must be taken that especially the tumbler socket which in some cases bears the bushing will first engage the abutment in the extreme position and only then contact the ball of the joint at a second abutment surface. This assures, especially in the uninstalled condition, that contact in the extreme position is cushioned. This kind of abutment definition is especially suitable for the present resilient ball joint bearing according to the invention, but it can also be used to advantage in other universal joints without resilient ball joint bearing.

Other embodiments of cross joints are also suitable for universal joint systems. If, for example, especially great ease of movement and uniform motion are required, the double joint is advantageously made with a universal joint, also called a constant velocity joint, especially of the constant speed fixed link type. Between the two joints, which are joined together by a housing, the ball joint is again arranged with the resilient mounting, so that the shaft extremities are mounted for flexural movement through the two joints. Constant velocity joints are manufactured as "Löbro-Gelenke" by Löhr & Bromkamp GmbH, DE 6050 Offenbach.

The invention shall now be described with the aid of embodiments and diagrammatic figures, wherein:

FIG. 9b shows schematically and in section the plastic frictional guiding means with plastic spring corresponding to FIG. 9a.

Figures 1, 2:
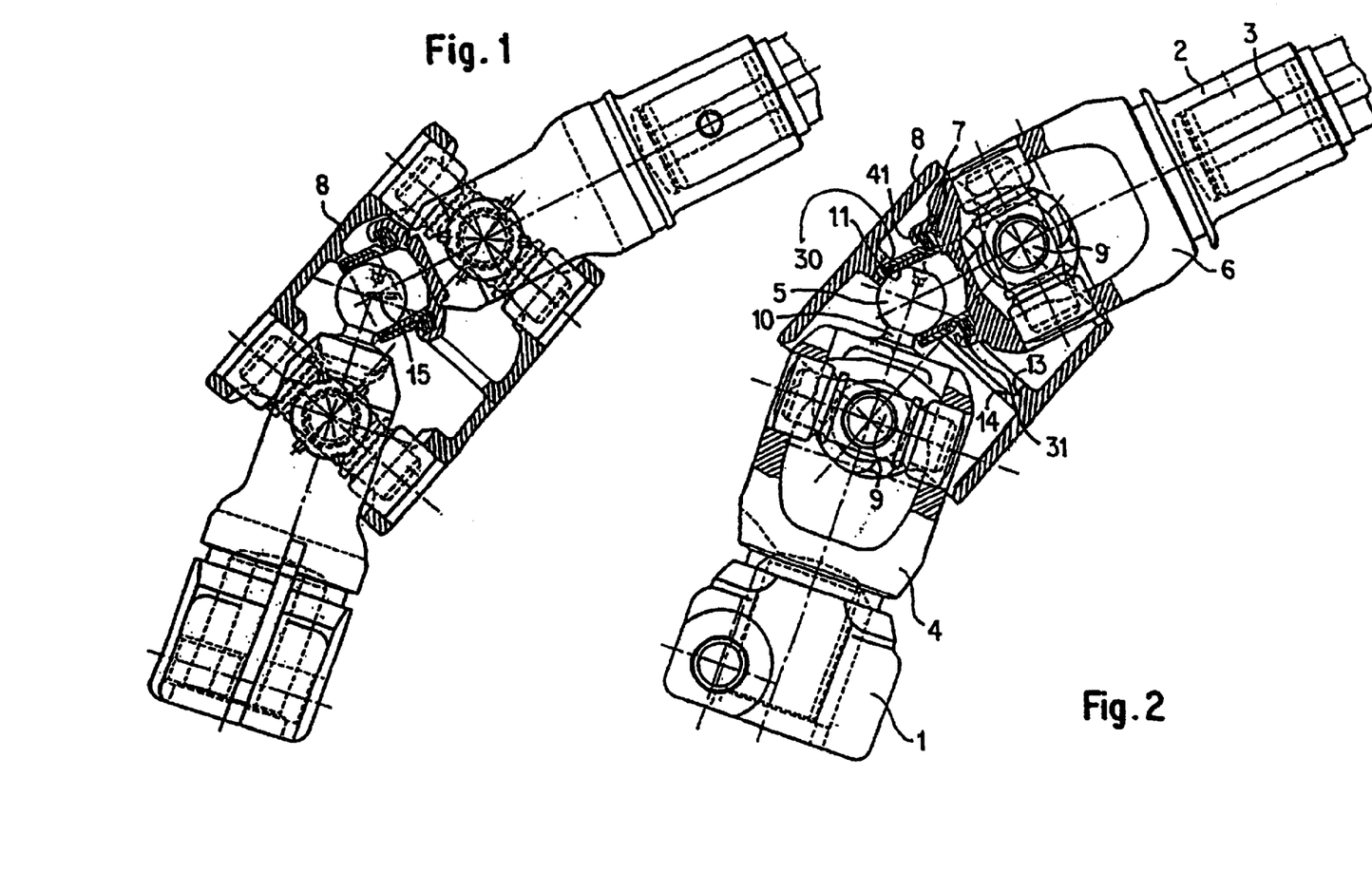
FIG. 1 shows schematically and in section an embodiment according to the invention of a steering shaft double-cross universal joint.
FIG. 2 shows schematically and in section another embodiment according to the invention of a steering shaft double-cross universal joint rotated 90° and with abutment means to limit deflection.

A steering shaft double-cross universal joint according to the invention is represented in FIGS. 1 and 2. The joint consists of a tubular dual fork coupling case 8 in which two joint crosses 9 are mounted for movement. The shaft ends 1 and 2 are jointed on one another by means of the forks 4 and 6 which are journaled on the joint crosses 9, and by means of a ball joint. The ball joint includes a ball 5 mounted to one shaft end 1, 2 and a socket 7 mounted to the other shaft end 1, 2. The ball 5 is resiliently mounted for rotation about its center point in the socket 7 and is slidingly moveable in the direction of the shaft axis of the other shaft end 1, 2. Bellows can protect the joint against dirt.

The socket 7 is configured as a sliding sleeve or accommodates a cylindrical bushing which is coated either with an antifriction material, for example an antifriction metal, such as preferably a sintered metal with supporting sleeve. To permit an appropriate equalization of tolerances, the socket 7 is mounted resiliently to the fork 6, so as to be deflected in a tumbling manner with respect to the shaft axis 3 by a certain transverse force. The bias of the plate spring 31 is selected such that a sufficiently great restoring force is present and the tolerance equalization is assured combined with ease of operation.

In FIG. 2 there is shown in cross section a joint rotated 90 degrees, in which the forks 4 and 6 are represented at the shaft ends 1 and 2. The latter can be movably inserted, as mentioned, in the crosses 9 on the casing 8, which can be tubular, for example. In the central inner area of the casing the end abutments 13 and 14 are represented, which are in the form of annular raised portions and are helpful until the joint is assembled, and serve simultaneously as safety abutments in extreme terminal positions of the joint. The abutment surfaces 13 and 14 are configured such that the socket 7 when in the extreme position with respect to the ball 5 will first make movement-limiting contact with the abutment 13.

Figure 3:
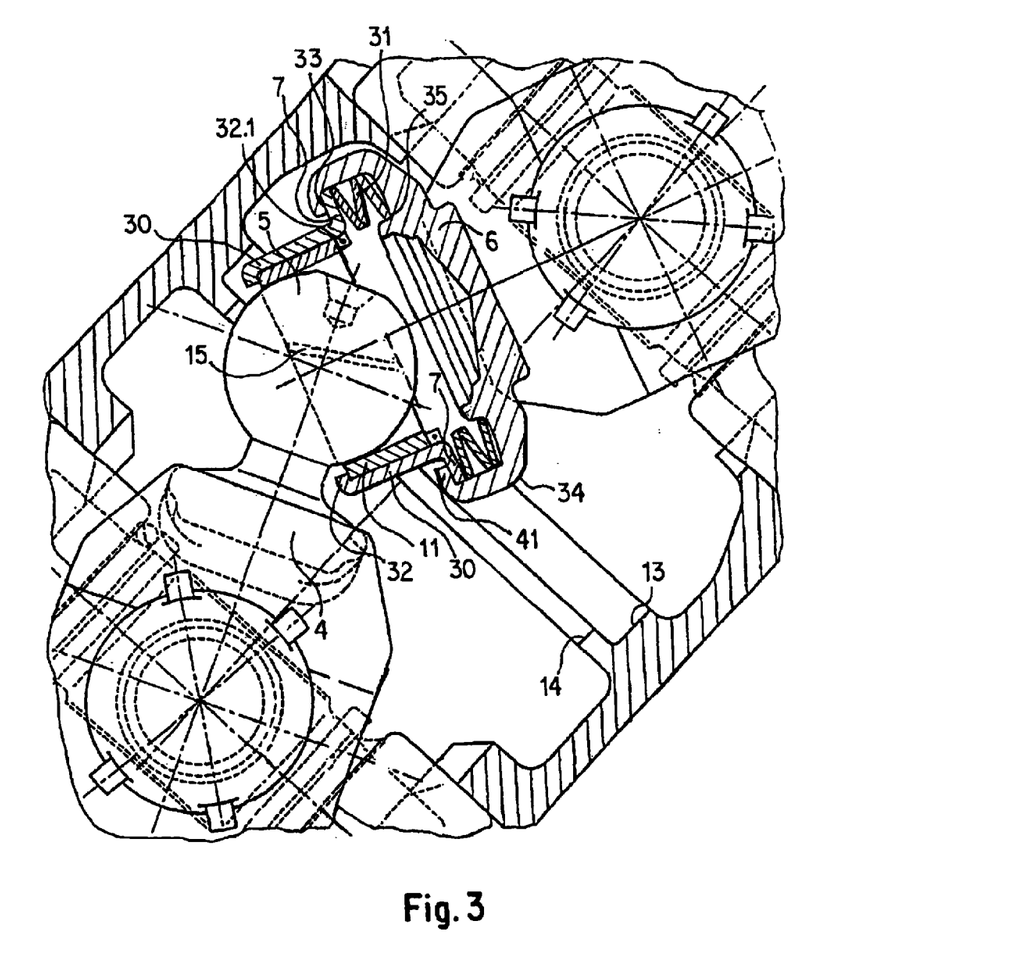
FIG. 3a shows schematically a modification of the bearing system.
FIG. 3b shows schematically and in sections, an enlargement according to FIG. 2, of another variable of the resilient bearing system of the tumbler sleeve with bushing.

The bushing 11, which is shown in cross section in FIG. 3, is advantageously interrupted by a slot 15 so that the bushing can breathe radially and can be fitted with bias onto the ball 5. This brings it about that the bushing 11 rotates and/or slides on the ball 5 without clearance. The slot 15 can be created either lengthwise of the shaft or in spiral form or in any other way that interrupts the wall.

Another possibility for increasing the springing action of the bushing 11 or provide for additional damping consists, in addition to the tumbler bearing on the fork 6, in applying a rubber-elastic material between the bushing 11 and the socket 7.

In FIG. 3 is shown how the socket 7 can be held on the fork with bias as a tumbler socket 7 by springs 31. On account of the great bias force that is to be applied and the small amount of space available, plate springs are preferred. They furthermore are less expensive. Another appropriate spring mounting is possible by the use of rubber-elastic 31P (FIG. 3a) pads which can be in annular form, for example, held between metal disks 31D. This can be done if necessary in a layered configuration.

In FIG. 3 it is furthermore to be seen that the plate springs 31 are held advantageously in an annular chamber 34 which is formed at the end of fork 6 at a shaft end. In FIG. 3, the tumbler guide means 7, 30, is provided with a flange 33 which serves as a spring abutment and is urged against another flange 41 configured as a holding lip or claw, so that, in the rest position, it is aligned axially with the shaft axis. The flange 41 furthermore holds the friction bearing in an axial position.

Figures 3A, 3B:
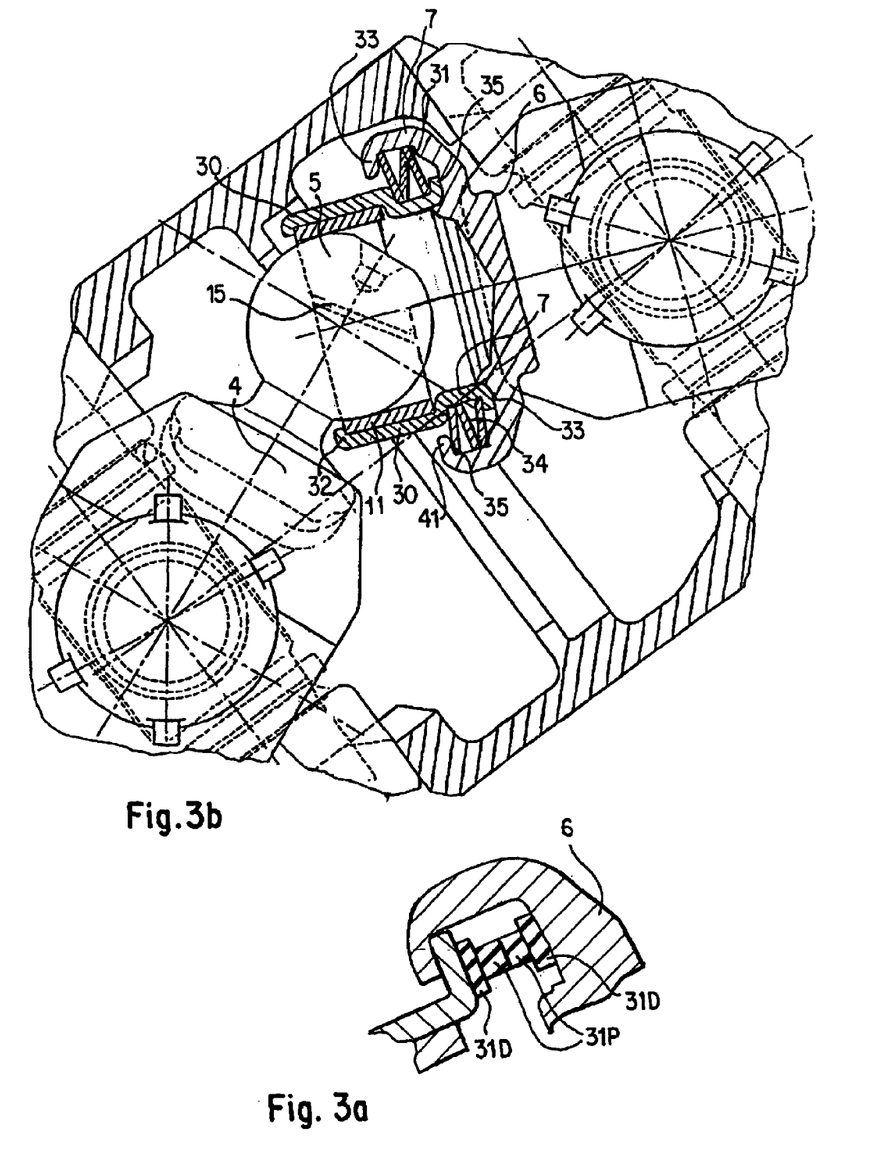

In FIG. 3b, another variant of the tumbler sleeve mounting is shown; here the tumbler sleeve 7, 30 is urged by a spring or springs 31 abutting flange 33 on the tumbler aide against the flange 35 on the fork side. The spring 31 in that case thrust against the flange 41 forming the chamber 34; for assembly they are held on the socket 7. In this manner, as shown in FIGS. 3 and 3b, the tumbler sleeve 7, 30 (or the socket 7, 30) is resiliently pivotably mounted to the other shaft end and resiliently supported in the axial direction, so that the tumbler sleeve 7, 30 can tumble resiliently about the shaft axis when subjected to a radial force. The bushing 11 is advantageously affixed to the tumbler socket 7 by holding means 32, 32.2. Advantageously this is accomplished by rim 82, at least on the side of bushing 11 remote from the fork 6. The hook of the rim 32 should overlap the bushing 11 at least to the extent that, when wear occurs and free play results it will not drop out. At the other end of the bushing 11 a retaining projection 32.1 can be provided which holds the bushing 11 in place in the other axial direction.

Figure 4:
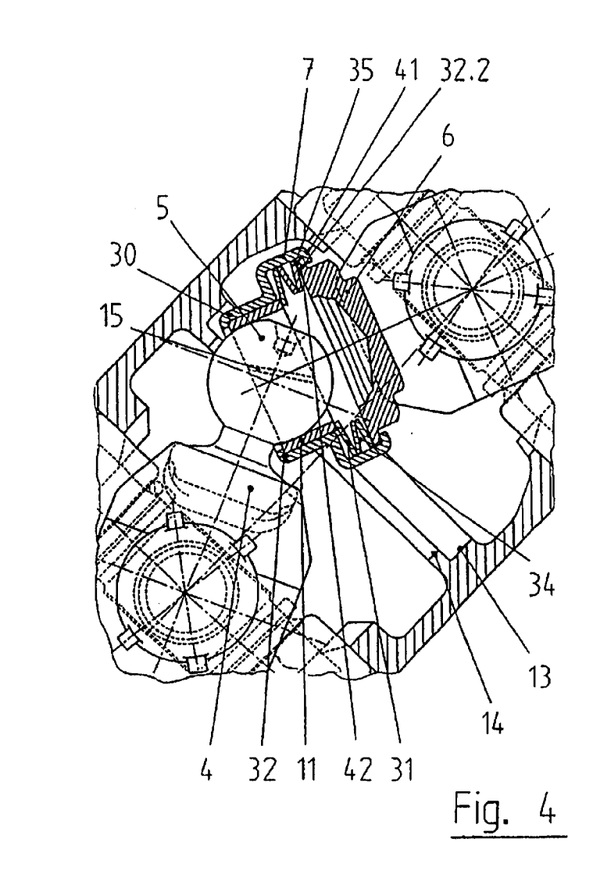
FIG. 4 shows schematically and in section another variant of the resilient bearing system with a flanged tumbler sleeve.

Additional possibilities for the bearing are represented in FIG. 4. In the upper half of the figure a rim 32.2 clutches the fork 6 on the side facing away from the ball of a projection 42. The springs 31 are held between the front side of the projection 42 and a rim of the bushing 11 forming an annular chamber 34.

Figures 5, 5A:
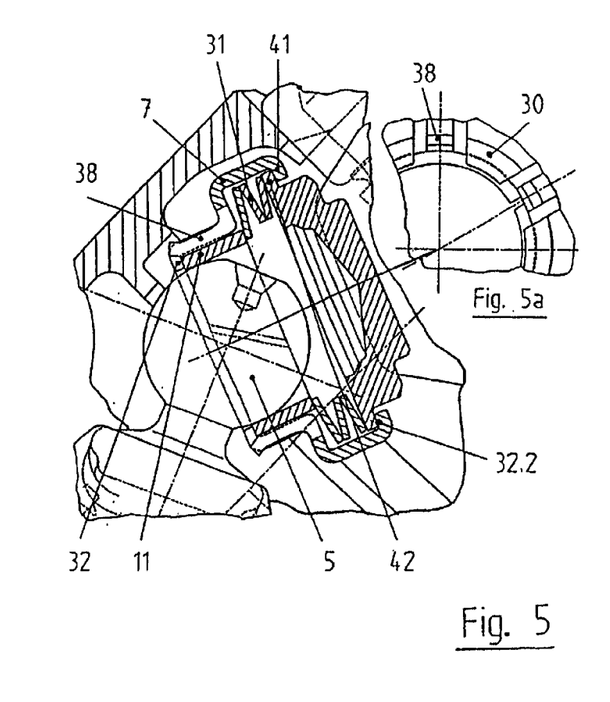
FIG. 5 shows schematically and in section another variant of the resilient bearing system with free play compensating spring fingers.
FIG. 5a shows schematically and in section a spring finger according to FIG. 5.

As represented in FIGS. 5 and 5a, the bushing 11 can additionally be held resiliently by spring fingers 38, the latter being provided or formed on the tumbler sleeve 30. This provides additional compensation for tolerances.

Figure 6:
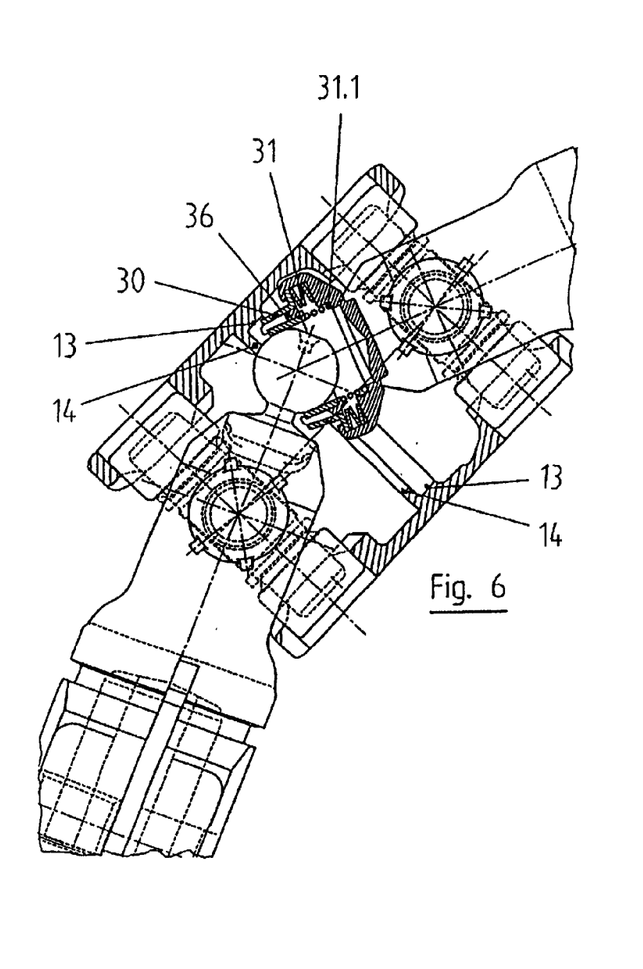
FIG. 6 shows schematically and in section an additional free play compensating variant, also with a plastic sleeve of adjustable diameter between the tumbler socket and the slide bushing to compensate for tolerances and wear.

The use of a preferably adapting plastic sleeve 36, between the bushing 11 and the tumbler guide, according to FIG. 6, additionally permits the free play of the bearing to be held closer to zero by compensating for wear and it simplifies assembly. The tapering shape of the plastic sleeve 36 and tumble guide 7,30 additionally improves adjustment to zero free play. The plastic sleeve can be shaped in an appropriate manner, preferably tapering and likewise slotted, so that the bushing 11 is fixed, for example by lugs which overlap the bushing 11 at its extremity. It is advantageous if a spring 31.1 urges the taper adaptably. A suitable plastic is chiefly POM, but also PA, PA and GF.

Figure 7:
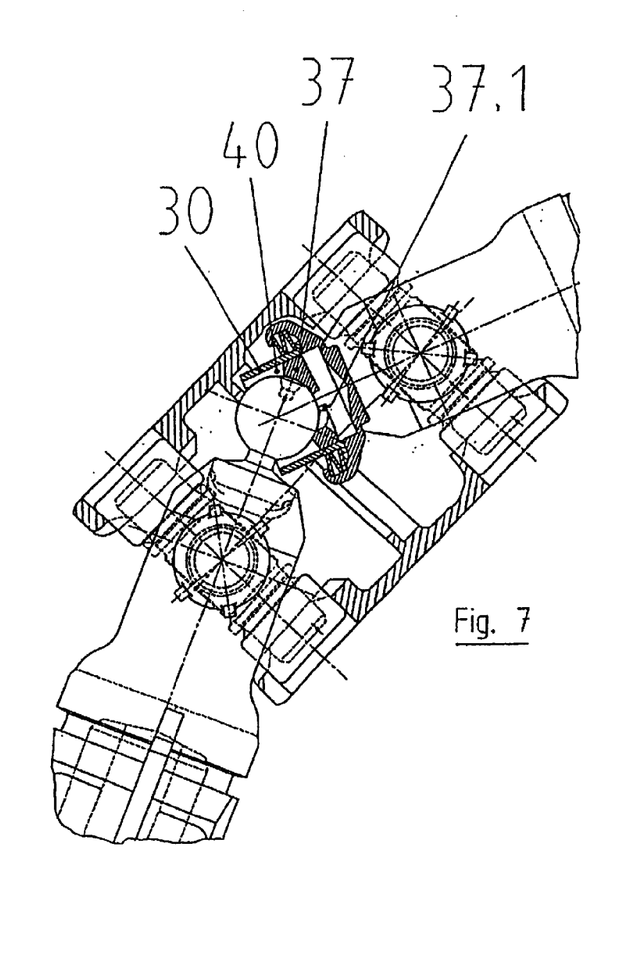
FIG. 7 shows schematically and in section another variant with a plastic frictional guiding means held on the ball and the tumbler socket configured as a slide bushing.

Another possibility for simplifying the bearing, as shown in FIG. 7, consists in omitting the metal bushing 11 and providing a rotatory plastic friction bearing 37 on the ball, which is held for axial sliding movement in the tumbler guide 30, 7. An additional slight compensation of free play can be accomplished by spring lips which rub with pressure on the ball surface in the deflected joint and axially displace the plastic bearing in play.

Figure 8:
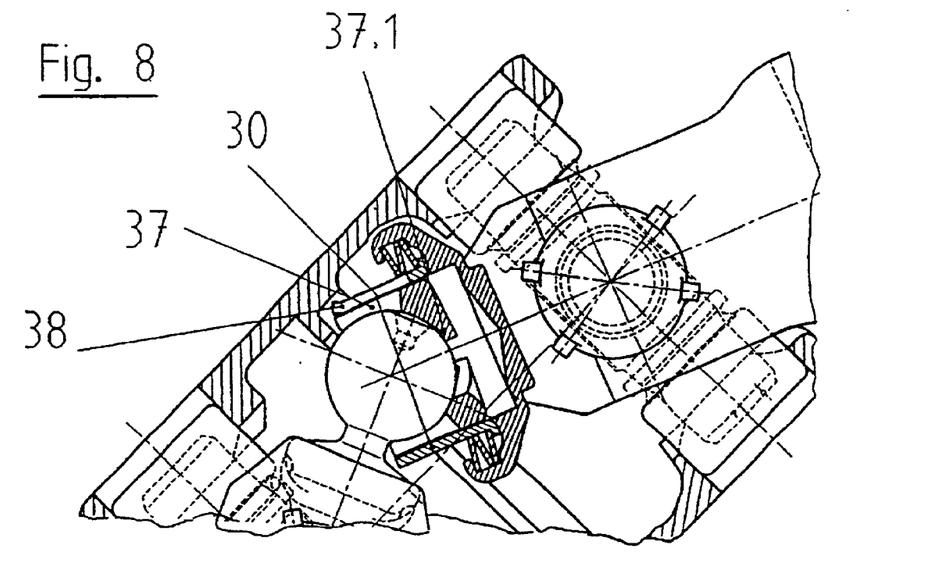
FIG. 8 shows schematically and in section an embodiment corresponding to FIG. 7 with the tumbler socket configured as a spring adjusting to zero free play for the plastic frictional guiding means.
Figure 8A:
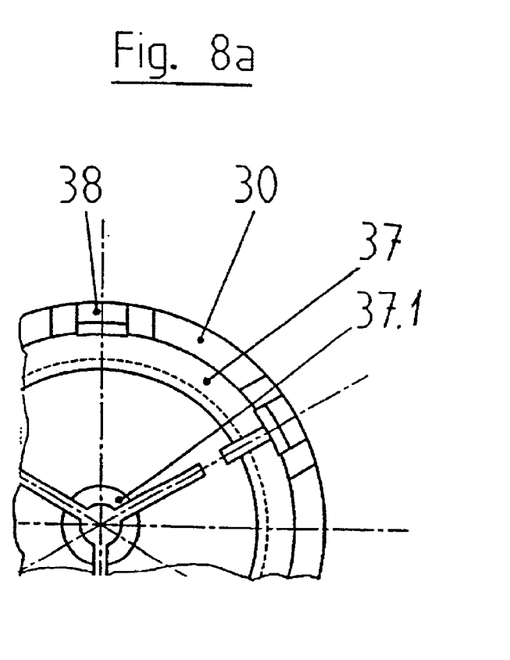
FIG. 8a shows schematically and in section the tumbler socket according to FIG. 8.
Figure 8B:
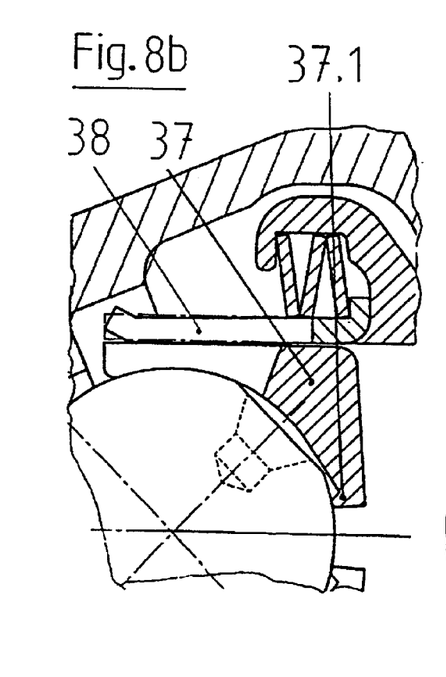
FIG. 8b shows a detail of FIG. 8 in section and enlarged.

As represented in FIGS. 8, 8a and 8b, the system can be further improved by making the cylindrical tumbler guide 7, 30, spring-elastic in its wall area, and having it surround the plastic sliding guide 37 without clearance and even compensating in case of wear. This is easy to accomplish by appropriate choice of a material and by providing slots which interrupt the wall in some areas and thus form resilient spring fingers 38. This embodiment can be made at especially low cost and makes the joint easy to assemble. Additional advantages are the large-surface contact with the ball and thus less wear, good damping of shocks and a great selection of appropriate materials such as POM, PA, PA + GF, as well as plastic and carbon fiber materials which have particularly good lubricant properties. POM in this case is especially suitable and low in cost. In addition, slots in the central area of the sliding guide 37 can be shaped to form spring lips 37.1 in order to surround the ball 5 resiliently with still less clearance.

Figure 9A:
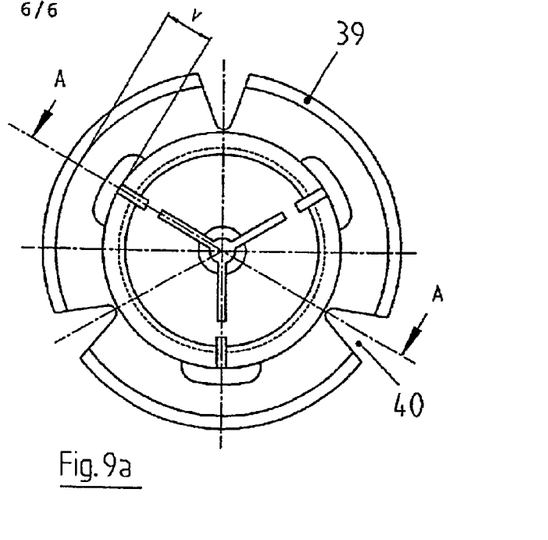
FIG. 9a shows schematically and in section another embodiment of a plastic frictional guiding means with plastic spring, in the uninstalled state.
Figure 9B:
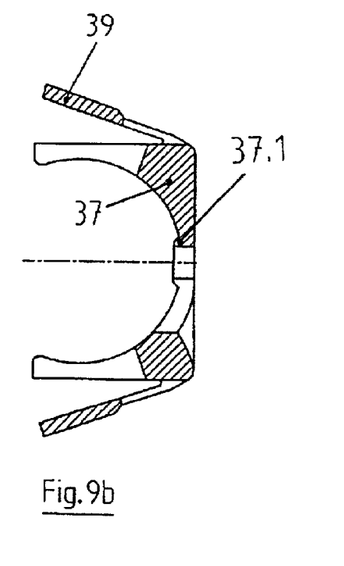
Figure 10A:
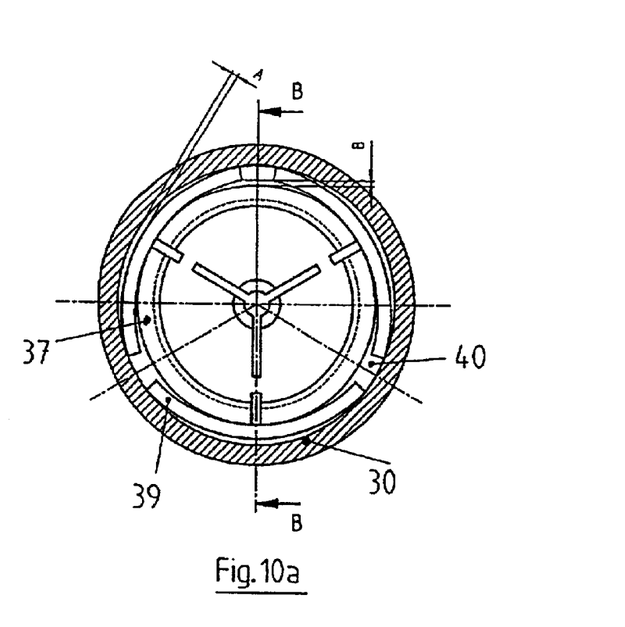
FIG. 10a schematically shows in cross-section, a plastic guide according to FIG. 9, shown in an installed position FIG. 10b schematically and in a longitudinal cross-section, a plastic guiding means according to FIG. 9, also in an installed condition.
Figure 10B:
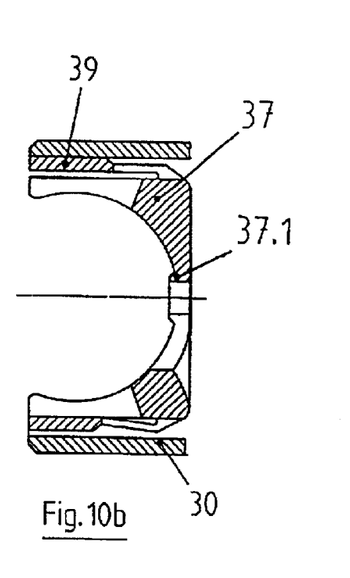

The guide 37 is preferably injection molded directly into the ball 5. The variant in FIGS. 9b and 9a shows in longitudinal and cross section an additional preferred possibility for a damping compensation of free play in the unbiased state. The plastic sliding guide 37 is provided in its outer wall area with a plastic spring 39, which permits sliding without free play under bias V. The spring 39 is preferably made in one piece with the plastic guide 37, the spring being preferably slotted 40 so that it can breathe radially and being in contact with the inside surface of the tumbler guide 30 in a wear and tolerance equalizing manner. In FIG. 10 the same plastic sliding guide as in FIG. 9 is shown in the installed state. The tolerance gaps A, B, which the spring spans with respect to the tumbler guide 30, are shown schematically.

The features of novelty which characterize the invention are pointed out with particularity in the claims annexed to and forming a part of this disclosure and are entirely based on the Swiss priority application.

What is claimed is:

1. Steering shaft universal double joint for motor vehicles with shaft ends fastened against rotation in the universal double joint, these ends being held for movement in a housing joining two single joints and the shaft ends being joined together between the two single joints by a ball joint so that a ball, connected to one of the shaft ends, is mounted for rotation about a center point of the ball in a socket of the other shaft end and is slidingly movable in the direction of the shaft axis of the other shaft end, wherein the socket is resiliently pivotably mounted to the other shaft end.

2. Universal double joint according to claim 1, further comprising:
a slide bushing held by the socket, the slide bushing being enveloped at least partially by the socket and being disposed between the ball and the socket.

3. Universal double joint according to claim 2,
wherein the resiliently pivotably mounting of the socket in the other shaft end includes metal springs.

4. Universal double joint according to claim 3,
wherein the metal springs are plate springs, and
wherein the plate springs are biased against the socket, so that the shaft axis,
when in the unstressed position, is aligned with the axis of the socket.

5. Universal double joint according to claim 3,
wherein the metal springs include plate springs.

6. Universal double joint according to claim 2,
wherein the bushing consists of a sintered metal.

7. Universal double joint according to claim 2,
wherein the bushing is slotted such that the bushing is resiliently movable in a radial direction.

8. Universal double joint according to claim 2,
wherein the bushing envelops the ball in a wear- and tolerance-equalizing manner in any working position, the bushing being installed in the socket with about zero clearance.

9. Universal double joint according to claim 2,
wherein at the other shaft end, an annular chamber is formed to accommodate a pre-biased spring disposed between a first flange on the shaft end side and a second flange on the socket, so that the socket can tumble resiliently about the shaft axis in case of radial action by a force.

10. Universal double joint according to claim 2,
wherein the bushing is held in an axial direction at at least one end by the socket by a rim or by claws.

11. Universal double joint according to claim 2,
wherein, between the bushing and the socket, a plastic sleeve, is provided, and the plastic sleeve is under pressure applied by a spring.

12. Universal double joint according to claim 2,
wherein the socket is resiliently supported in the axial direction.

13. Universal double joint according to claim 2,
wherein the slide bushing is resiliently held by the socket.

14. Universal double joint according to claim 1,
wherein the resiliently pivotably mounting of the socket in the other shaft end includes metal springs.

15. Universal double joint according to claim 1,
wherein the resiliently pivotably mounting of the socket in the other shaft end includes elastomeric spring pads.

16. Universal double joint according to claim 1,
wherein a plastic sliding guide is provided between the socket and the ball such that the plastic sliding guide receives the ball for rotational movement and is carried for sliding movement in the axial direction by the socket, the guide being injection-molded directly onto the ball.

17. Universal double joint according to claim 16,
wherein the socket has spring-finger structure on its circumference and resiliently grips the plastic sliding guide between the ball and the socket.

18. Universal double joint according to claim 17,
wherein the plastic sliding guide is enveloped in an outer wall area by a pre-biased plastic spring which slides in the socket, this spring having slots in its circumference, so that it can breathe in the radial direction.

19. Universal double joint according to claim 16,
wherein the plastic sliding guide is enveloped in an outer wall area by a pre-biased plastic spring which slides in the socket, this spring having slots in its circumference, so that it can breathe in the radial direction.

20. Universal double joint according to claim 1,
wherein on an inner wall of the housing an abutment structure is provided for the ball and the socket.

21. Universal double joint according to claim 20,
wherein the abutment structure is so configured that the ball and the socket define given allowable positions in all extreme joint deflections and in the case of assembly, the abutment structure being so configured that in case of abutment first the socket and then the ball makes contact.

22. A steering shaft universal double joint for motor vehicles, comprising:
two shaft ends;
two single joints, each shaft end being connected to one of the joints;
a housing joining the two single joints; and
a socket and a ball joint disposed in the socket, the shaft ends being joined together between the two single joints by the ball joint and socket, wherein the ball joint is associated with one of the shaft ends and is able to rotate in the socket and slidingly movable in the direction of the shaft axis of the other shaft end, and wherein the socket is resiliently pivotably connected to the other shaft end.

23. The universal double joint according to claim 22, further comprising:
a bushing disposed between the ball joint and the socket, wherein the bushing is resiliently disposed in the socket.

24. The universal double joint according to claim 23, further comprising:
a spring, wherein the socket is resiliently pivotably mounted to the other shaft end using the spring, and the spring biases the socket to a position where an axis of the socket is aligned with an axis of the other shaft end.

25. The universal double joint according to claim 24,
wherein the socket is resiliently supported in the axial direction by the spring.

26. The universal double joint according to claim 23,
wherein the bushing is slotted such that the bushing is resiliently movable in a radial direction within the socket.

27. The universal double joint according to claim 26,
wherein the bushing envelops the ball in a wear- and tolerance-equalizing manner, the bushing being installed in the socket with zero clearance.

28. The universal double joint according to claim 22,
wherein the socket is resiliently supported in the axial direction by the other shaft end.

29. The universal double joint according to claim 22, further comprising:
a slotted and tapered plastic sleeve disposed between the bushing and the socket.

30. The universal double joint according to claim 22, further comprising:
a plastic sliding guide disposed between the socket and the ball such that the plastic sliding guide receives the ball for rotational movement and is carried for sliding movement in the axial direction by the socket.

31. The universal double joint according to claim 30,
wherein the sliding guide is injection-molded directly onto the ball.

32. The universal double joint according to claim 30,
wherein the plastic sliding guide is enveloped in an outer wall area by a pre-biased plastic spring which slides in the socket, the plastic spring having slots in a circumference of the spring, so that the plastic spring can breathe in the radial direction.

33. The universal double joint according to claim 22,
wherein the other shaft end includes an annular chamber containing a spring disposed between a first flange on the side of the other shaft and a second flange on the socket, so that the socket can tumble resiliently about the shaft axis when subjected to a radial force.

* * * * *